Feb. 23, 1960  F. C. RAUSCH  2,925,793
CORN PLANTER ATTACHMENT
Filed March 25, 1957  2 Sheets-Sheet 1
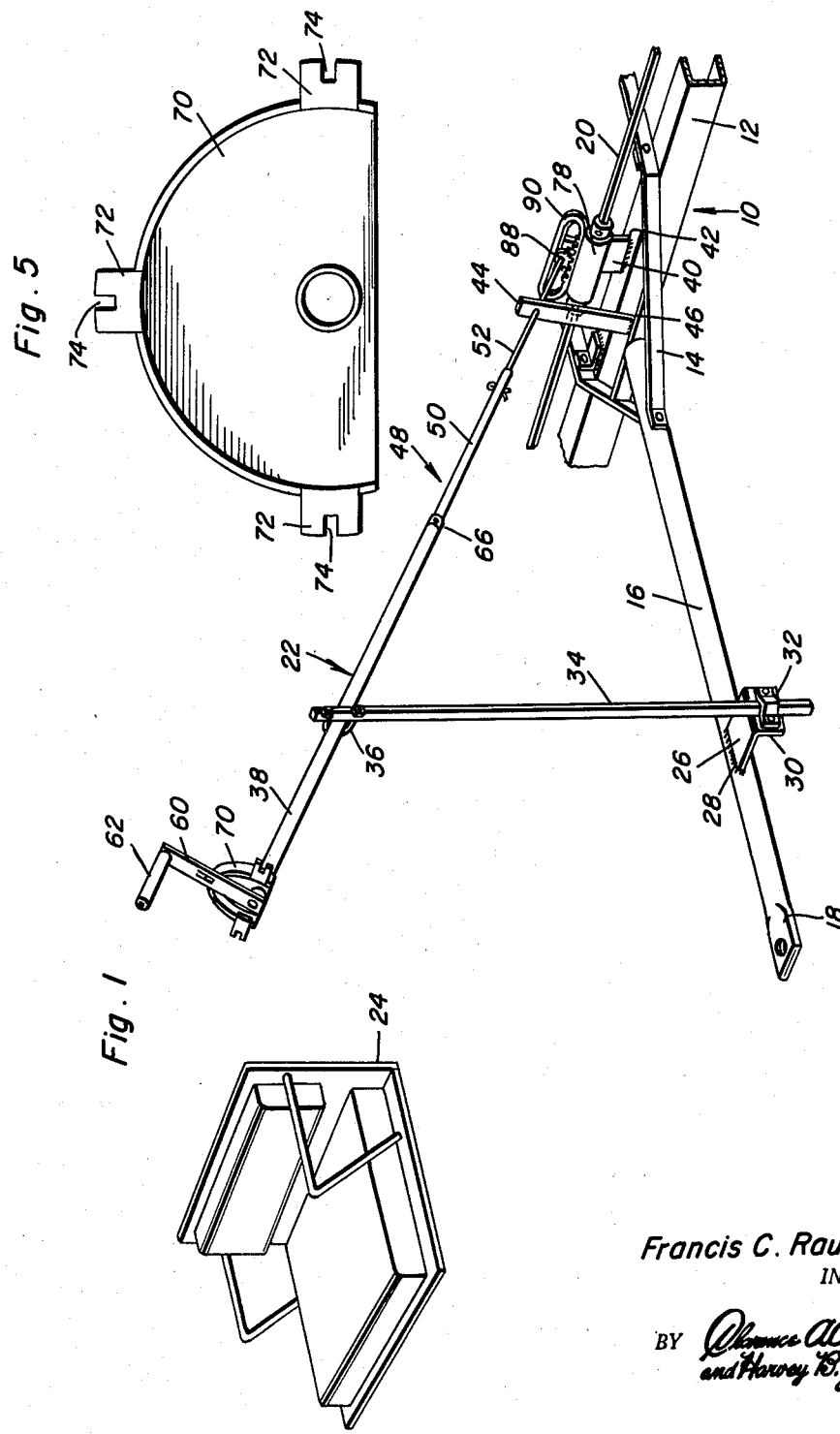
Francis C. Rausch
INVENTOR.

Feb. 23, 1960   F. C. RAUSCH   2,925,793
CORN PLANTER ATTACHMENT
Filed March 25, 1957   2 Sheets-Sheet 2
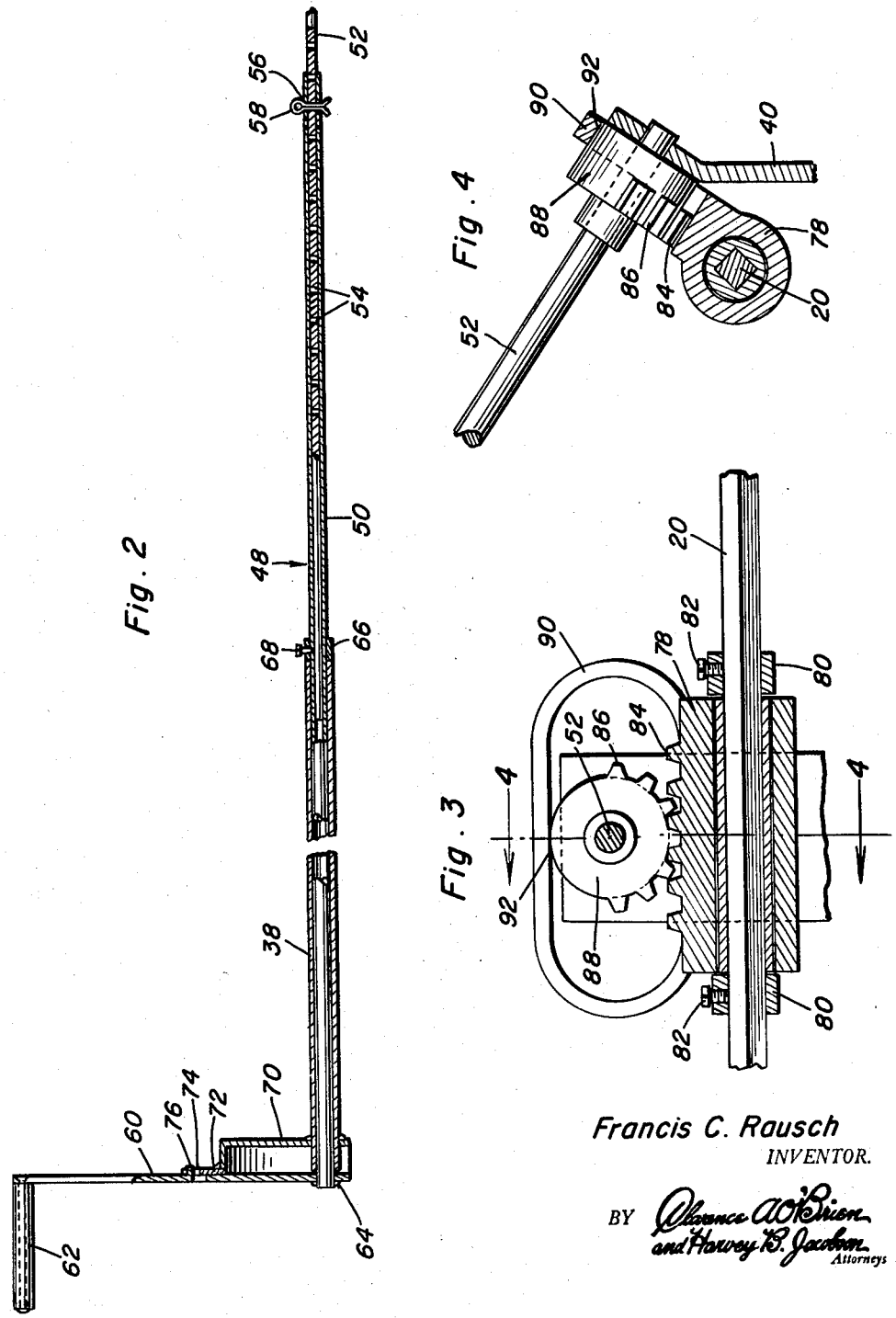
Francis C. Rausch
INVENTOR.

United States Patent Office 2,925,793
Patented Feb. 23, 1960

2,925,793
CORN PLANTER ATTACHMENT
Francis C. Rausch, Winamac, Ind.
Application March 25, 1957, Serial No. 648,059
2 Claims. (Cl. 111—15)

This invention relates in general to new and useful improvements in agricultural equipment and more specifically to an improved corn planter attachment.

Existing corn planters are provided with transversely extending drill shafts for retaining the gear ratio of the corn planter whereby the distance between the seed droppings may be varied. However, the corn planter, as now being manufactured, is such that the operator of the corn planter must dismount from the tractor in order to shift the drill shaft. While in many instances this would make no difference, there are times when in a single field the soil conditions warrant the changing of the distance between seed droppings. This is particularly true in rolling hilly land. By permitting the operator of the corn planter to vary the distance between the seed droppings as the planting operation proceeds, the efficiency of the corn planting operation could be greatly increased.

It is therefore the primary object of this invention to provide an attachment for corn planters which includes a mechanism for operating the drill shaft from the operator's seat of a towing tractor in order that the operator of the towing tractor of a corn planter may selectively change the distance between the seed droppings during the corn planting operation as he sees fit.

Another object of this invention is to provide an improved attachment for corn planters for shifting the drill shaft of the corn planter during a corn planting operation, the attachment being of such a nature whereby it may be readily attached to existing corn planters with a minimum of effort on the part of either manufacturer or a farmer and which is so constructed whereby the operating crank thereof may be placed immediately adjacent the operator of a towing tractor for convenient manipulation.

A further object of this invention is to provide an improved attachment for shifting drill shafts of corn planters from the operator's seat of a towing tractor, the attachment being formed of readily obtainable materials so as to be economically feasible and being of such a nature whereby operation thereof is positive so as to assure the absence of any failure.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of a forward part of a corn planter and shows mounted thereon the attachment, the operator's seat of a tractor being shown in its proper relation to the tongue of the corn planter and the attachment;

Figure 2 is an enlarged fragmentary longitudinal sectional view taken through the control shaft of the attachment and shows the specific details of the construction and mounting thereof;

Figure 3 is an enlarged fragmentary transverse sectional view taken along the drill shaft in the vicinity of the control shaft and shows the specific details of the connection between the two;

Figure 4 is an enlarged sectional view taken substantially upon the plane indicated by the section line 4—4 of Figure 3; and Figure 5 is an enlarged elevational view of a control shaft positioning member.

Referring now to the drawings in detail, there is shown in Figure 1 a forward portion of a conventional corn planter 10. The corn planter 10 includes a frame 12 which has secured thereto by means of a yoke assembly 14 a forwardly extending tongue 16 which terminates in a flattened pin engaging forward end 18. Carried by the frame 12 for transverse shifting movement is a transversely extending drill shaft 20 for the purpose of shifting the gears of a corn planter to vary the distance between the droppings.

In order that the drill shaft 20 may be shifted from a remote point during the operation of a corn planter 10, there is provided a control attachment 22. The control attachment 22 extends from the drill shaft 20 to a point adjacent an operator's seat 24 of a towing tractor (not shown) for the corn planter 10.

The control attachment 22 includes a mounting bracket 26 which is secured as by welding 28 to the forward part of the tongue 16. The mounting bracket 26 includes a vertical flange 30 carrying an adjustable clamp 32. Clamped against the vertical flange 30 for selected vertical adjustment is a standard 34 which is provided adjacent its upper end with a clamp 36 in the form of a U-bolt. Carried by the clamp 36 is an elongated sleeve 38.

Extending upwardly from the frame 12 is a rear support 40. The rear support 40 is secured to the frame 12 as by welding 42. Extending upwardly from the yoke 14 is an intermediate support 44. The intermediate support 44 is secured to the yoke 14 as by welding 46. At this time it is pointed out that the welding may be replaced by suitable bolts, etc., to facilitate the mounting of the control attachment 22 in the field.

The control attachment 22 also includes an elongated control shaft 48 best shown in Figure 2. The control shaft 48 includes an elongated tubular upper portion 50 which has telescoped in the lower end thereof a lower portion 52. The lower portion 52 is provided with a plurality of transverse holes 54 which are selectively alignable with transverse holes 56 in the upper portion 50. A fastener 58 extends between the aligned holes 54 and 56 to adjustably connect the underneath portions 50 and 52 so as to provide a control shaft 48 of a desired length.

The control shaft 48 has the upper end part thereof journaled within the sleeve 38. The lower portion 52 extends through the lower part 40 and the intermediate support 44 and is rotatably journaled therein.

In order that the control shaft 48 may be selectively rotated into position, secured to the control shaft 48 is a crank 60 which includes a handle 62. The crank 60 is secured to the control shaft 48 as at 64. The crank 60 abuts the upper end of the sleeve 38 and is retained in that position by an adjustable collar 66 mounted on the control shaft 48 and retained in abutting engagement with the lower end of the sleeve 38 by setscrews 68.

Carried by the upper end of the sleeve 38 is a control shaft positioning member 70. The member 70 is arcuate in outline, as is best illustrated in Figure 5, and includes three projecting ears 72 which are spaced approximately 90° apart. The ears 72 are provided with notches 74 in which there is selectively received a pin portion 76 of the crank 60. The pin portion 76 being struck rearwardly from the crank 60 as is best shown in Figure 2.

In order that rotary movement of the control shaft 48 may be transmitted into transverse shifting movement of the drill shaft 20, there is mounted on the intermediate part of the drill shaft 20 a rack 78. The rack 78 is retained in position on the drill shaft 20 by collars 80 having setscrews 82 retaining them in place. The rack 78 includes teeth 84 which are meshed with teeth 86 of a drive gear 88 carried by the lower portion 52 of the control shaft 48. In order that the teeth 84 and 86 may be retained in mesh engagement, there is carried by the rack 78, a guide 90 which is disposed about the gear 88 and which has an upper part engaging a smooth upper portion of the gear 88 as at 92.

Although the particular rack and gear construction illustrated and described has been deemed at the present the most economical and positive connection between the control shaft 48 and the drill shaft 20, if desired, other types of mechanical connections may be utilized.

From the foregoing description of the present invention, it will be readily apparent that the control attachment 22 permits the rapid changing of the gear settings of a corn planter by the operator of a towing tractor at such time as the operator so desires without the necessity of the operator either stopping the tractor or dismounting therefrom thereby permitting a greater freedom of the variation in the distance between corn droppings to provide a more efficient planting operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use with a corn planter of the type including, a frame, a tongue and a transversely extending drill shaft transversely shiftable to change the distance between seed droppings, a shift mechanism for said drill shaft, said shift mechanism comprising a lower support adapted to be carried by said frame, an upper support adapted to be carried by said tongue, a control shaft mounted in said supports for rotation, said upper support including an elongated sleeve in which said control shaft is journaled, a crank mounted on said elongated sleeve adapted to be positioned adjacent the forward end of said tongue whereby said control shaft may be operated by an operator of a towing tractor, a control shaft positioning member on said sleeve adjacent said crank, locking means on said crank interlockable with said control shaft positioning member for retaining said control shaft in an adjusted position, and means on said control shaft remote from said crank connected to said drill shaft for shifting said drill shaft transversely in response to rotation of said control shaft, said means including a rack on said drill shaft and a gear on said control shaft, said gear including a toothed portion and a smooth portion, said toothed portion being meshed with said rack, a guide carried by said rack, said smooth portion adapted to ride in said guide to maintain the mesh between said teeth and said rack, said locking means including a rearwardly struck pin portion on said crank, said positioning member having an arcuate outline and including circumferentially spaced projecting ears, notches in said ears receiving said pin portions.

2. For use with a corn planter of the type including, a frame, a tongue and a transversely extending drill shaft transversely shiftable to change the distance between seed droppings, a shift mechanism for said drill shaft, said shift mechanism comprising a lower support adopted to be carried by said frame, an upper support adapted to be carried by said tongue, a control shaft mounted in said supports for rotation, said upper support including an elongated sleeve in which said control shaft is journaled, a crank mounted on said elongated sleeve adapted to be positioned adjacent the forward end of said tongue whereby said control shaft may be operated by an operator of a towing tractor, a control shaft positioning member on said sleeve adjacent said crank, locking means on said crank interlockable with said control shaft positioning member for retaining said control shaft in an adjusted position, means on said control shaft remote from said crank connected to said drill shaft for shifting said drill shaft transversely in response to rotation of said control shaft, said means including a rack on said drill shaft and a gear on said control shaft, said gear including a toothed portion and a smooth portion, said toothed portion being meshed with said rack, a guide carried by said rack, said smooth portion adapted to ride in said guide to maintain the mesh between said teeth and said rack.

References Cited in the file of this patent

UNITED STATES PATENTS

| | | |
|---|---|---|
| 92,678 | Weusthoff | July 13, 1869 |
| 286,596 | Ercanbrack | Oct. 16, 1883 |
| 719,562 | Brush | Feb. 3, 1903 |
| 911,069 | Perkins | Feb. 2, 1909 |
| 1,086,511 | Christoffersen | Feb. 10, 1914 |
| 1,211,332 | Mehrings | Jan. 2, 1917 |
| 1,286,044 | McNeal | Nov. 26, 1918 |
| 1,332,161 | Dahlen | Feb. 24, 1920 |
| 2,708,891 | Ohnstad | May 24, 1955 |

FOREIGN PATENTS

| | | |
|---|---|---|
| 715,310 | Great Britain | Sept. 8, 1954 |

OTHER REFERENCES

Publication: John Deere Operator's Manual, OM-B1-453, September 1, 1955, pages 4, 5, 41 and 50 required.